United States Patent
Gaughan et al.

(10) Patent No.: US 12,030,473 B2
(45) Date of Patent: Jul. 9, 2024

(54) BRAKE MONITORING SYSTEM

(71) Applicant: Westinghouse Air Brake Technologies Corporation, Pittsburgh, PA (US)

(72) Inventors: Edward Gaughan, Wilmerding, PA (US); Karen Carriere, Winnipeg (CA); William Potter, Wilmerding, PA (US); Vincent Troiani, Wilmerding, PA (US); Frank Huchrowski, Wilmerding, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 602 days.

(21) Appl. No.: 17/191,493

(22) Filed: Mar. 3, 2021

(65) Prior Publication Data
US 2021/0276526 A1   Sep. 9, 2021

Related U.S. Application Data

(60) Provisional application No. 62/985,147, filed on Mar. 4, 2020.

(51) Int. Cl.
*B60T 17/22* (2006.01)

(52) U.S. Cl.
CPC .......... *B60T 17/228* (2013.01); *B60T 17/221* (2013.01); *B60T 2270/404* (2013.01); *B60T 2270/88* (2013.01)

(58) Field of Classification Search
CPC .... B60T 17/221; B60T 17/228; B60T 13/665; B60T 2270/404; B60T 2270/88
See application file for complete search history.

(56) References Cited

U.S. PATENT DOCUMENTS

| | | | |
|---|---|---|---|
| 4,317,988 A | 3/1982 | Wilson | |
| 6,322,161 B1 | 11/2001 | Maslonka et al. | |
| 7,769,509 B2 | 8/2010 | Gaughan et al. | |
| 9,216,724 B1 | 12/2015 | Wright et al. | |
| 9,963,126 B1 | 5/2018 | Wright | |
| 2007/0044551 A1* | 3/2007 | Fogelstrom | B60T 17/221 73/121 |
| 2008/0129480 A1 | 6/2008 | Gaughan et al. | |
| 2013/0304313 A1 | 11/2013 | Svensson et al. | |

(Continued)

FOREIGN PATENT DOCUMENTS

| | | |
|---|---|---|
| KR | 10-2019-0064826 A | 6/2019 |
| WO | 2017035516 A1 | 3/2017 |

OTHER PUBLICATIONS

Afshari et al., "A train air brake force model: Car control unit and numerical results", 2012, Institution of Mechanical Engineers, Journal of Rail and Rapid Transit (Year: 2012) 18 pages.

(Continued)

*Primary Examiner* — Stephen Holwerda
(74) *Attorney, Agent, or Firm* — K&L Gates LLP (57) ABSTRACT

A brake monitoring system monitors pressures in a brake system of a vehicle system at different locations in the vehicle system. Decreases in the pressures are determined at two or more of the different locations. The times at which the decreases in the pressures occurred are determined. A location of interest of a leak in the brake system is determined by comparing the times at which the decreases in the pressures occurred.

20 Claims, 3 Drawing Sheets

(56) References Cited

U.S. PATENT DOCUMENTS

| | | |
|---|---|---|
| 2015/0025737 A1* | 1/2015 | Hermsen ............... B60T 17/221 |
| | | 701/33.9 |
| 2016/0264120 A1* | 9/2016 | Kellner ................. B60T 13/665 |
| 2016/0318491 A1 | 11/2016 | Seaton |
| 2017/0203745 A1 | 7/2017 | Kumar et al. |
| 2018/0319414 A1* | 11/2018 | Lefebvre ............... B61L 25/025 |
| 2019/0206261 A1 | 7/2019 | Szymczak et al. |
| 2020/0079343 A1* | 3/2020 | Martin .................... B60T 13/66 |
| 2020/0384974 A1 | 12/2020 | Call |
| 2021/0122350 A1 | 4/2021 | Farres et al. |
| 2021/0181760 A1 | 6/2021 | Lee |
| 2021/0284179 A1 | 9/2021 | Diamond et al. |
| 2021/0318199 A1 | 10/2021 | Rosenberg et al. |

OTHER PUBLICATIONS

International Search Report and Written Opinion dated Jun. 9, 2021 for corresponding International application No. PCT/US2021/020728 (15 pages).

International Preliminary Report on Patentability dated Sep. 15, 2022 for corresponding application No. PCT/US2021/020728 (9 pages).

\* cited by examiner

BRAKE MONITORING SYSTEM

CROSS-REFERENCE TO RELATED APPLICATIONS

This application claims priority to U.S. Provisional Application No. 62/985,147, which was filed on 4 Mar. 2020, and the entire disclosure of which is incorporated herein by reference.

BACKGROUND

Technical Field

The subject matter described herein relates to systems and methods that monitor operation of brake devices in a vehicle system.

Discussion of Art

Some vehicle systems include brake devices that are actuated using air pressure. Some rail vehicle systems include air brakes that engaged upon a reduction in air pressure in an air brake system. Several rail vehicles in a multiple rail vehicle system may be fluidly coupled with each other by an air brake pipe. As a result, a reduction in air pressure in the air brake pipe can propagate down the length of the rail vehicle system to reduce air pressure (and engage air brakes) in the rail vehicles that make up the rail vehicle system.

But, issues may arise that disrupt the continuity of the fluid coupling between the vehicles. For example, burst hoses in the air brake system, broken pipes in the air brake system, connector (e.g., gladhand) separations in the air brake system, faulty valves, or other causes of leaks in the air brake system can reduce the pressure in the air brake system. This reduction in pressure may cause the air pressure in the air brake system to be reduced, which can cause an unintended or undesired application of air brakes in the vehicle system. This air pressure reduction can propagate through the length of the brake pipe, which can cause additional unintended or undesired brake applications along the length of the vehicle system.

The cause of the leak may not be readily discernible. For example, a leak caused by a faulty valve or connector may not be easily detected by visual inspection of the air brake system. Even if the cause of the leak is readily discernible (e.g., a burse hose or gladhand separation), it can take a significant amount of time for a person to walk the length of the vehicle system and find the location of the leak.

One known device used to try and identify a location of a leak in a rail vehicle system is an Undesired Emergency (UDE) application time box. This box can be installed at the front and rear of a rail vehicle system. The UDE boxes measure the time difference between an arrival of an emergency application pressure wave at the first and last cars in the rail vehicle system. This time difference, along with the total brake pipe length and measured emergency transmission rate, can be used to estimate the origin of the emergency brake application. The precision of these boxes, however, is limited. For example, these boxes may only be able to identify the location of a leak within a three hundred to four hundred foot range. Additionally, the precision of these boxes can be reduced if a service brake application was made prior to the emergency application due to the air flow present in the brake pipe, which affects the propagation rate of an emergency brake application.

BRIEF DESCRIPTION

In one embodiment, a method (e.g., for monitoring a brake system) is provided that includes monitoring pressures in a brake system of a vehicle system at different locations in the vehicle system, determining decreases in the pressures that are monitored at two or more of the different locations, determining times at which the decreases in the pressures occurred, and determining a location of interest of a leak in the brake system by comparing the times at which the decreases in the pressures occurred.

In one embodiment, a system (e.g., a brake monitoring system) is provided that includes plural sensor assemblies configured to monitor pressures in a brake system of a vehicle system at different locations in the vehicle system. Two or more of the sensor assemblies at the different locations are configured to determine decreases in the pressures that are monitored and to determine times at which the decreases in the pressures occurred. The system also includes a system controller configured to determine a location of interest of a leak in the brake system by comparing the times at which the decreases in the pressures occurred.

In one embodiment, a system (e.g., a brake monitoring system) is provided that includes plural sensor assemblies configured to be disposed onboard different non-propulsion-generating vehicles of a multi-vehicle system. The sensor assemblies include pressure sensors configured to measure air pressures in an air brake system of the vehicle system. The sensor assemblies include clock devices and assembly controllers configured to determine decreases in the pressures that are monitored and to determine times at which the decreases in the pressures occurred from the clock devices. The system also includes a system controller configured to receive the times from the sensor assemblies and to determine a location of interest of a leak in the brake system by comparing the times at which the decreases in the pressures occurred.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments of the inventive subject matter described herein provide brake monitoring systems and methods that can quickly determine a location of a vehicle in a multi-vehicle system associated with an unintended or undesired brake application. An unintended or undesired brake application can include the engagement of a brake device that was not manually implemented (e.g., by moving a lever or handle, pressing a button, flipping a switch, pressing a pedal, etc.) and that was not automatically implemented (e.g., by a system that engages brakes based on sensed characteristics).

The brake monitoring system includes several sensor assemblies at different locations in a multi-vehicle system. For example, the sensor assemblies may be disposed onboard different vehicles in the multi-vehicle system. Alternatively, one or more of the sensor assemblies may be off-board the vehicles, such as in positions between the vehicles. The sensor assemblies can include a clock device, an assembly controller (e.g., a pressure switch), and a pressure sensor (e.g., a pressure transducer). The assembly controller can repeatedly monitor pressures measured by the pressure sensor and record a pressure drop event with a timestamp from the clock device that indicates when the drop in pressure occurred. The first or initial pressure drop event can be a decrease in pressure in an air brake pipe in a location measured by the pressure sensor, such as any pressure decrease, a pressure decrease above a threshold (e.g., a pressure decrease that is more than noise in the output of the sensor), or the like. The assembly controller determines the drop in brake pipe pressure and records the event with a timestamp using the clock device.

After a designated delay (e.g., two seconds), the assembly controller obtains another pressure measurement from the pressure sensor. If this subsequent pressure measurement is below a threshold (e.g., below ten pounds per square inch, or psi, or another pressure), is more than a designated threshold (e.g., the decrease is at least twenty psi, at least thirty psi, at least forty psi, or the like), etc., then the assembly controller determines that a designated brake application has occurred. This designated brake application can be an emergency brake application that was not manually or automatically implemented by a computerized control system, as one example.

Because the pressure drop may propagate along the length of the brake pipe and the length of the air brake system, different sensor assemblies may detect the first or initial pressure drops associated with the designated brake application at different times. A system controller may obtain the timestamps from plural different sensor assemblies and compare these timestamps. In one example, the system controller may modify one or more of the timestamps to account for drift in one or more of the clock devices. The system controller can identify which sensor assembly provided the earliest timestamp (relative to all other sensor assemblies in the same vehicle system) and determine that the location of the leak in the air brake system is near the identified sensor assembly. For example, the system controller can determine that the leak is most likely closer to the identified sensor assembly than one or more (or all) other sensor assemblies. The system controller can store locations of the different sensor assemblies in the vehicle system to determine the location (e.g., the vehicle) in which the leak occurred.

Figure 1:
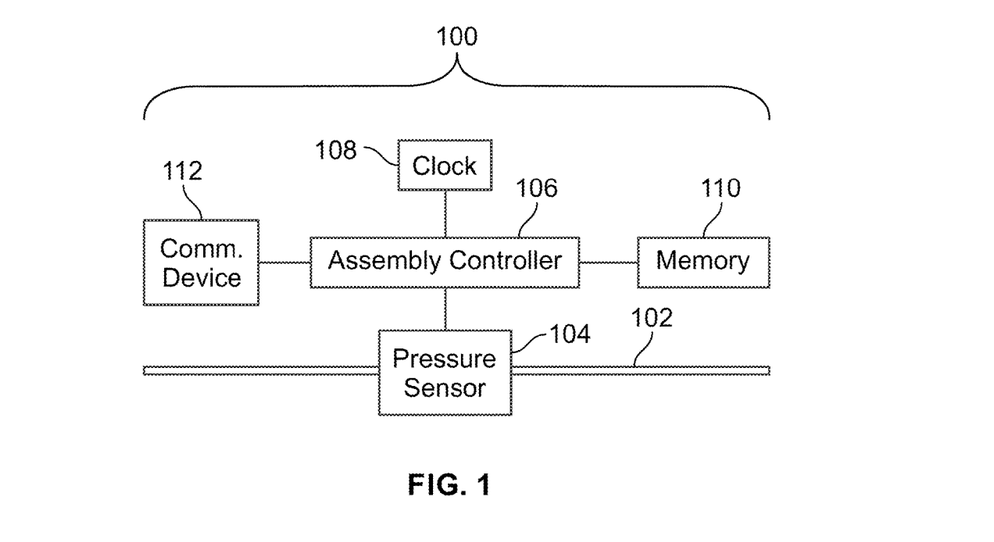
FIG. 1 illustrates one example of a sensor assembly.

FIG. 1 illustrates one example of a sensor assembly 100. The sensor assembly can be used to monitor pressures within an air brake pipe 102 of an air brake system in a vehicle system. The sensor assembly also can monitor times at which reductions in pressures occur to help identify a location of a leak in the brake system (referred to as a location of interest). The sensor assembly includes a pressure sensor 104 fluidly coupled with the air brake line. The pressure sensor can be a pressure transducer in one embodiment. The pressure sensor can repeatedly measure the pressure of the air in the air brake line. An assembly controller 106 represents hardware circuitry that controls operation of the sensor assembly. The assembly controller can include a pressure switch that is closed (or opened) responsive to a decrease in pressure in the brake pipe. Optionally, the assembly controller can include one or more processors (e.g., one or more microprocessors, field programmable gate arrays, integrated circuits, or the like) that perform the operations described in connection with the assembly controller.

The assembly controller can then wait for a designated period of time (e.g., two seconds or another length of time) to measure the pressure in the brake pipe again (using the pressure sensor). If the assembly controller determines that this additional pressure measurement indicates that the pressure in the brake pipe has decreased below a threshold (e.g., ten psi or another value) and/or that the pressure has dropped by a threshold amount, then this drop in pressure can indicate a brake application, such as an unintended emergency brake application, which may be caused by a leak in the brake system. If the pressure does not decrease below the threshold amount and/or does not decrease by at least a threshold amount between the initial and subsequent pressure measurements, then this may indicate that a brake application (unintended or otherwise) has not occurred.

A clock device 108 ("Clock" in FIG. 1) can track passage of time. The assembly controller can determine a time at which the pressure dropped (e.g., before the secondary measurement is obtained after the designated delay) from the clock device. The time at which the initial pressure drop is detected and/or one or more of the pressure measurements optionally can be stored in a tangible and non-transitory computer readable storage medium, or computer memory 110. The time at which the pressure initially dropped and/or one or more of the pressure measurements can be communicated from the sensor assembly to a system controller (described herein) using a communication device 112 of the sensor assembly. The communication device can represent hardware that communicates data signals via conductive pathways and/or wirelessly. For example, the communication device can represent modems, transceivers, antennas, or the like.

Figure 2:
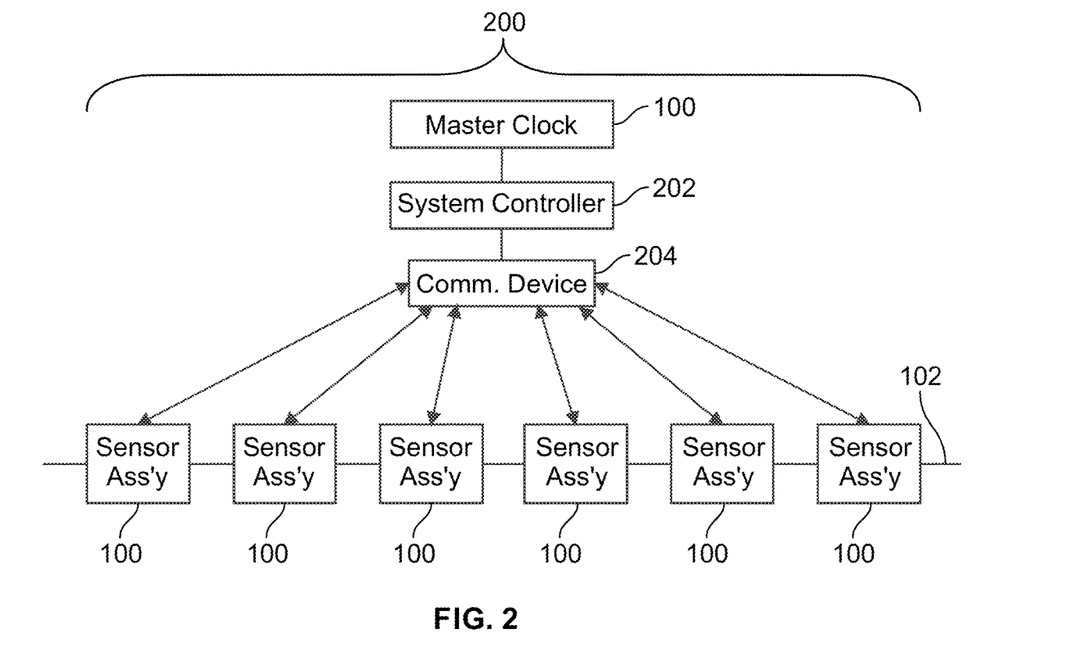
FIG. 2 illustrates one example of a brake monitoring system.

FIG. 2 illustrates one example of a brake monitoring system 200. The monitoring system can include several of the sensor assemblies. These sensor assemblies can be disposed at different locations the brake system (e.g., the air brake system). For example, the sensor assemblies can be disposed onboard different vehicles in a multi-vehicle system (e.g., with one sensor assembly onboard each of two or more of the vehicles, multiple sensor assemblies onboard each of two or more of the vehicles, etc.) and/or one or more of the sensor assemblies can be disposed between vehicles. The sensor assemblies can communicate the times at which the pressure decreases of brake applications occur (as described above) to a system controller 202 of the monitoring system via a communication device 204 ("Comm. Device" in FIG. 2) of the monitoring system. The system controller can represent hardware circuitry that includes and/or is connected with one or more processors (e.g., one or more microprocessors, integrated circuits, field programmable gate arrays, etc.) that perform the operations described in connection with the system controller.

The system controller can receive the different times at which the pressure drops are detected by the sensor assemblies and optionally can determine whether one or more of the times needs to be adjusted due to clock drift. For example, the system controller may repeatedly poll the clock devices of the sensor assemblies by sending poll signals to the assembly controllers. In response to receiving these poll signals, the assembly controllers can send response signals that include or represent the time of the clock devices of the respective sensor assemblies. The system controller can determine a difference between a time of the master clock device with the times of the clock devices as reported by the assembly controllers in the response signals. The difference between the time of the master clock device and the time reported by each assembly controller can be a time drift of the clock device of that assembly controller. The system controller can then adjust the time reported by the assembly controller by the amount of the drift. For example, if the difference between the master clock and the clock device of a sensor assembly is +45 seconds (e.g., the time of the clock device is forty-five seconds behind the master clock), the system controller can reduce the time reported by the clock device of the sensor assembly by forty-five seconds. This can ensure that the times reported by several sensor assemblies are synchronized to the same time reference (e.g., the time of the master clock).

The system controller can compare the times reported by the sensor assemblies with each other to determine where the pressure drop began. For example, the system controller can determine which sensor assembly detected the pressure drop before all other sensor assemblies. The location of the leak or other issue giving rise to the unintended brake application may be closer to the sensor assembly that reported the earliest pressure drop. As a result, the system controller can determine where the leak is located based on the location of the sensor assembly. The locations of the sensor assemblies may be known to the system controller (e.g., stored in a local or external memory). For example, an identification of the vehicles that the sensor assemblies are located on can be known to the system controller. Once the sensor assembly reporting the earliest pressure drop is identified, the system controller can determine the vehicle on which that sensor assembly is located. This vehicle can be identified by the system controller as the location of the leak in the brake pipe or air brake system.

Once the location of the leak is located, the system controller can implement one or more responsive actions. As one example, a warning signal or message can be communicated or presented. This signal or message can generate an alarm, present a display to an operator, or the like, to notify the operator of the location of the detected leak. As another example, the system controller can send a signal or message to request inspection and/or repair of the air brake system at the identified location of the leak. The system controller can communicate a signal requesting that the vehicle associated with the leak be removed from the vehicle system for inspection and/or repair. As another example, the system controller can change movement of the vehicle system. The system controller can prevent the vehicle system from traveling faster than a designated speed (e.g., which is slower than a speed limit of the route on which the vehicle system is traveling). Optionally, the system controller can stop movement of the vehicle system until the leak is repaired.

Figure 3:
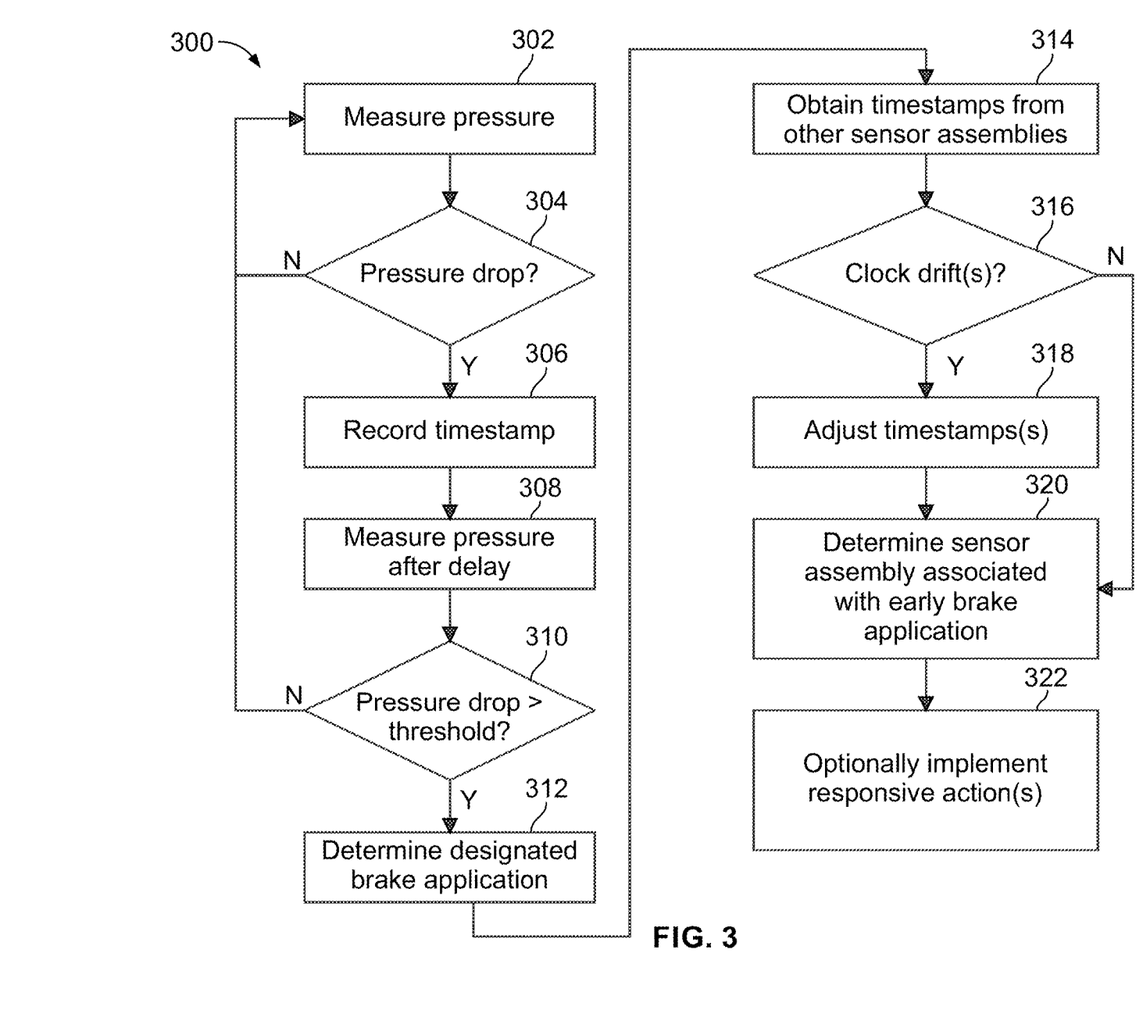
FIG. 3 illustrates a flowchart of one embodiment of a method for monitoring a brake system.
Figure 4:
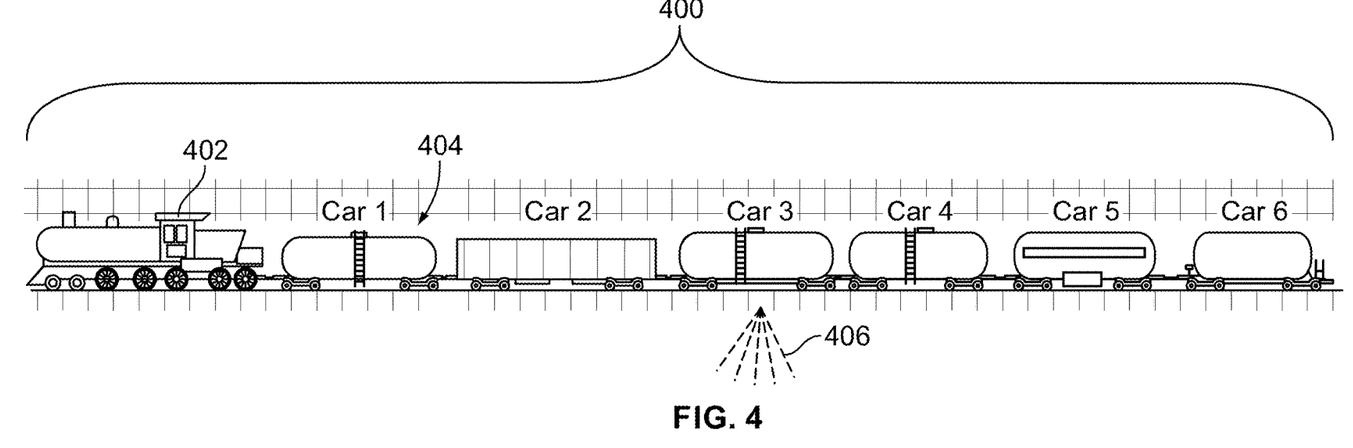
FIG. 4 illustrates operation of a vehicle system in connection with the method shown in FIG. 3.
Figure 5:
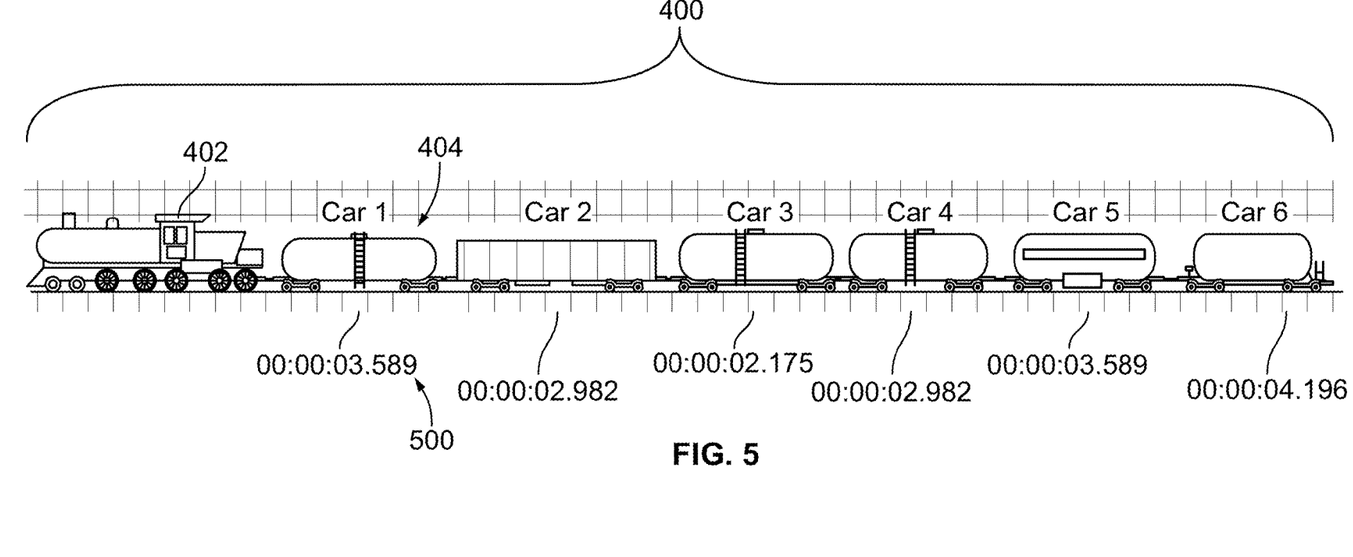
FIG. 5 also illustrates operation of a vehicle system in connection with the method shown in FIG. 3.

FIG. 3 illustrates a flowchart of one embodiment of a method 300 for monitoring a brake system. The method can represent operations performed by the brake monitoring system described herein. With continued reference to the flowchart of the method shown in FIG. 3, FIGS. 4 and 5 illustrate operation of a vehicle system 400 in connection with the method. The vehicle system is a multi-vehicle system that includes at least one propulsion-generating vehicle 402 and one or more non-propulsion-generating vehicles 404 ("Car 1", "Car 2", etc.). In the illustrated embodiment, the vehicle system is a rail vehicle system formed from a locomotive and six rail cars. Alternatively, the vehicle system may be formed from vehicles other than rail vehicles. For example, the vehicle system may be formed from a truck and one or more trailers using an air brake system and/or hydraulic brake system. The pressures of the air and/or hydraulic fluid can be monitored as described here to identify locations of leaks. The brake system described above can extend along the vehicle system.

The operations described in connection with 302, 304, 306, 308, 310, 312 may be performed by each of two or more sensor assemblies that are connected with the same brake system at different locations. The operations described in connection with 314, 316, 318, 320, 322 may be performed by the system controller. At 302 in the method 300, pressure of the brake system is measured. For example, each of two or more of the sensor assemblies fluidly coupled with the same brake system in different locations may measure pressures of the brake system at the different locations.

At 304, a determination is made as to whether the pressure has decreased. For example, the sensor assemblies may repeatedly measure the pressure of the brake system at 302 and a determination may be made (e.g., at each of two or more of the sensor assemblies) at 304 as to whether the pressure measured by that sensor assembly has decreased. If the measured pressure has decreased, then this decrease may indicate that a brake application, such as an undesired emergency brake application, is beginning. As a result, flow of the method 300 can proceed toward 306. As shown in FIG. 4, the third non-propulsion-generating vehicle (e.g., "Car 3" in FIG. 4) has experienced a leak 406 in the brake pipe. The decreased pressure of the brake pipe that is determined at 304 may indicate this leak 406.

But, if the measured pressure has not decreased, then the lack of decrease in measured pressure may indicate that a brake application, such as an undesired emergency brake application, has not occurred or has not begun. As a result, flow of the method 300 can return toward 302 for measurement of additional pressures. Alternatively, the method can terminate.

At 306, a timestamp is determined. For example, the time at which a decrease in pressure is measured by a sensor assembly may be determined from the clock device of the sensor assembly. At 308, the pressure of the brake system is measured again by the sensor assembly. The same sensor assembly that measured the pressure decrease at 302, 304 and that determined the time of the pressure decrease at 306 may measure the pressure of the brake system again at 308. This second or subsequent pressure measurement can be performed at the same location but after a designated time delay from detection of the pressure drop at 304. For example, after determining that the measured pressure decreased at 304, the sensor assembly onboard the vehicle "Car 3" in FIG. 4 can wait for two seconds or another period of time before measuring the pressure of the same brake system again.

At 310, a determination as to whether the pressure measurements indicate that the pressure decreased below a designated threshold. For example, the sensor assembly can determine whether the pressure measured at 308 at the vehicle "Car 3" is less than a threshold of twenty psi, less than a threshold of ten psi, or another limit. Optionally, the determination may be made as to whether the decrease in pressure from the measurement obtained at 302 and the measurement obtained at 308 at the vehicle "Car 3" is greater than a designated decrease. For example, the sensor assembly can determine whether the pressures measured at 302 and 308 indicate that the pressure in the brake system at the vehicle "Car 3" dropped by at least forty psi, at least fifty psi, or the like.

If the pressure drops to below the threshold (or the pressure drop is greater than the threshold), then the pressure or pressure drop can indicate a brake application. This additional check on the pressure drop can serve as confirmation that the decrease in pressure identified at 304 is a brake application and not a temporary fluctuation of pressure (that is not caused or part of a brake application). But, if the emergency brake application was not manually or automatically implemented by an operator or computerized control system of the vehicle system, then the brake application may not be an intended application. Consequently, flow of the method can proceed toward 312. But, if the pressure does not drop below the threshold or the pressure drop is not greater than the threshold, then the pressure or pressure drop may not indicate a brake application. As a result, flow of the method can return toward 302 for measurement of additional pressures. Alternatively, the method can terminate. At 312, a designated brake application is determined to have occurred. For example, the assembly controller can determine that the decreased pressure or the drop in pressure indicates that an emergency brake application has occurred.

As described above, the operations of 302, 304, 306, 308, 310, and 312 may be performed by each of two or more sensor assemblies coupled with the same brake system. The operations of 314, 316, 318, 320, 322 may be performed by the system controller. At 314, timestamps are obtained from sensor assemblies that identified a designated brake application. For example, the times at which different sensor assemblies coupled with the same brake system detected the pressure decrease (e.g., at 304) at or near the beginning of the brake application can be obtained (e.g., received) by the system controller. As shown in FIG. 5, several timestamps 500 from sensor assemblies disposed onboard the different non-propulsion-generating vehicles may be sent to the system controller.

At 316, a determination may be made as to whether the timestamps received by any of the sensor assemblies include clock drifts. As described above, the clock device of one or more of the sensor assemblies may drift away from the time managed by the master clock device of the system controller. The system controller can determine whether any clock drifts are present by examining the times provided by the sensor assemblies in the response signals received in response to the poll messages. If the timestamp provided by one or more of the sensor assemblies is subject to clock drift, then one or more of the timestamps may need to be adjusted to ensure that the timestamps from the sensor assemblies can be accurately compared with each other. As a result, flow of the method 300 can proceed toward 318. But, if the timestamps provided by the sensor assemblies are not subject to clock drift (e.g., the clock devices of the sensor assemblies are all synchronized to the master clock or the same time reference), then the timestamps may not need to be adjusted. As a result, flow of the method 300 can proceed toward 320.

At 318, the timestamp(s) that include clock drift are modified. The system controller can determine the amount of clock drift for a timestamp of a sensor assembly based on the response signal received from the sensor assembly, as described above. The amount of the clock drift can be used to adjust the timestamp from the sensor assembly. This can be repeated for the timestamps sent from sensor assemblies demonstrating clock drift to ensure that the timestamps are all on the same time reference.

At 320, the sensor assembly associated with the location of the early brake application is identified. For example, the system controller can compare the timestamps reported by the sensor assemblies to determine which of these timestamps occurred first or earliest. With respect to the example shown in FIG. 5, the timestamp provided by "Car 3" is earliest. This indicates that the drop in pressure was first detected by the sensor assembly onboard "Car 3." The system controller can determine that the leak is located onboard "Car 3," such as in the segment of the brake pipe in "Car 3," in a connector or valve of the brake pipe onboard "Car 3," or the like.

At 322, one or more responsive actions may be implemented. As one example, the system controller can send a signal to an off-board repair facility to identify the location of the leak as well as request or schedule inspection and/or repair of the leak at the identified location. As another example, the system controller can send a signal to an output device (e.g., an electronic display, a speaker, or the like) to generate a warning onboard the vehicle system and/or identify the location of the leak. As another example, the system controller can restrict movement of the vehicle system (or can communicate a signal to a controller of the vehicle system), such as by reducing an upper speed at which the vehicle system can move, by stopping movement of the vehicle system, by directing one or more other brake systems to actuate, or the like. Operation of the method can then terminate or can return to 302 to repeat one or more times.

While one or more embodiments of the inventive subject matter described herein relate to rail vehicles and air brake systems, not all embodiments are limited to rail vehicles and/or air brake systems. One or more embodiments may be used in connection with other vehicle types, such as trucks pulling trailers with air brakes; automobiles or other vehicles having hydraulic brakes (where the hydraulic fluid pressure is measured instead of air pressure to locate the leak inside the vehicle); or the like.

In one embodiment, a method (e.g., for monitoring a brake system) is provided that includes monitoring pressures in a brake system of a vehicle system at different locations in the vehicle system, determining decreases in the pressures that are monitored at two or more of the different locations, determining times at which the decreases in the pressures occurred, and determining a location of interest of a leak in the brake system by comparing the times at which the decreases in the pressures occurred.

Optionally, the pressures that are monitored are air pressures.

Optionally, the brake system is an air brake system that extends through and fluidly couples multiple vehicles of the vehicle system.

Optionally, the pressures are monitored onboard each of two or more vehicles in the vehicle system.

Optionally, the times of the decreases in pressure are determined by measuring a first decrease of the decreases in the pressures at a first location of the locations, determining a first timestamp associated with measurement of the first decrease, and confirming that the first decrease indicates a brake application by measuring the pressure at the first location after a time delay from measurement of the first decrease.

Optionally, the method also can include modifying one or more of the times at which the decreases in the pressures occurred based on one or more clock drifts of one or more clock devices located at one or more of the locations where the pressures are measured.

Optionally, the location of interest of the leak in the brake system is determined by identifying an earliest time of the times at which the decreases in pressure occurred and determining the location associated with the decrease in the pressure associated with the earliest time.

In one embodiment, a system (e.g., a brake monitoring system) is provided that includes plural sensor assemblies configured to monitor pressures in a brake system of a vehicle system at different locations in the vehicle system. Two or more of the sensor assemblies at the different locations are configured to determine decreases in the pressures that are monitored and to determine times at which the decreases in the pressures occurred. The system also includes a system controller configured to determine a location of interest of a leak in the brake system by comparing the times at which the decreases in the pressures occurred.

Optionally, the sensor assemblies are configured to monitor air pressures of the brake system as the pressures.

Optionally, the brake system is an air brake system that extends through and fluidly couples multiple vehicles of the vehicle system.

Optionally, the sensor assemblies are configured to be disposed onboard each of two or more vehicles in the vehicle system.

Optionally, the sensor assemblies are configured to determine the times of the decreases in pressure by measuring a first decrease of the decreases in the pressures at a first location of the locations, determining a first timestamp associated with measurement of the first decrease, and confirming that the first decrease indicates a brake application by measuring the pressure at the first location after a time delay from measurement of the first decrease.

Optionally, the system controller is configured to modify one or more of the times at which the decreases in the pressures occurred based on one or more clock drifts of one or more clock devices located at one or more of the locations where the pressures are measured.

Optionally, the system controller is configured to determine the location of interest of the leak in the brake system by identifying an earliest time of the times at which the decreases in pressure occurred and determining the location associated with the decrease in the pressure associated with the earliest time.

In one embodiment, a system (e.g., a brake monitoring system) is provided that includes plural sensor assemblies configured to be disposed onboard different non-propulsion-generating vehicles of a multi-vehicle system. The sensor assemblies include pressure sensors configured to measure air pressures in an air brake system of the vehicle system. The sensor assemblies include clock devices and assembly controllers configured to determine decreases in the pressures that are monitored and to determine times at which the decreases in the pressures occurred from the clock devices. The system also includes a system controller configured to receive the times from the sensor assemblies and to determine a location of interest of a leak in the brake system by comparing the times at which the decreases in the pressures occurred.

Optionally, the multi-vehicle system is a rail vehicle system.

Optionally, the system controller is configured to modify one or more of the times from one or more of the sensor assemblies due to clock drift of one or more of the clock devices.

Optionally, the system controller is configured to determine the location of interest of the leak in the brake system by identifying an earliest time of the times from the sensor assemblies.

Optionally, the system controller is configured to determine the location of interest as the location associated with the sensor assembly that provided the earliest time to the system controller.

Optionally, the sensor assemblies are configured to confirm the decreases in the pressures by repeating measurement of the pressures following determining the times at which the decreases in the pressures are determined.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art.

Such other examples are intended to be within the scope of the claims if they have structural elements that do not differ from the literal language of the claims, or if they include equivalent structural elements with insubstantial differences from the literal language of the claims.

What is claimed is:

1. A method comprising:
measuring pressures in a brake system of a vehicle system at different locations in the vehicle system using pressure sensors onboard different vehicles in the vehicle system;
determining decreases in the pressures that are monitored at two or more of the different locations using a system controller;
determining times at which the decreases in the pressures occurred;
re-measuring at least one of the pressures in at least one of the different locations using at least one of the pressure sensors following a designated delay after the at least one of pressures was previously measured in the at least one of the different locations;
identifying a leak in the brake system responsive to the at least one of the pressures that was re-measured not being below a designated threshold associated with a designated brake application using the system controller; and
responsive to identifying the leak in the brake system, determining a location of interest of the leak in the brake system by comparing the times at which the decreases in the pressures occurred and identifying an earliest of the times at which the decreases in the pressures occurred and the location associated with the earliest of the times using the system controller.

2. The method of claim 1, wherein the pressures that are monitored are air pressures.

3. The method of claim 1, wherein the brake system is an air brake system that extends through and fluidly couples multiple vehicles of the vehicle system.

4. The method of claim 1, wherein the pressures are monitored onboard each of two of the vehicles in the vehicle system.

5. The method of claim 1, further comprising modifying one or more of the times at which the decreases in the pressures occurred using the system controller and based on one or more clock drifts of one or more clock devices located at one or more of the locations where the pressures are measured.

6. The method of claim 5, further comprising:
sending a poll message to the one or more of the pressure sensors;
receiving a response signal from the one or more of the pressure sensors that includes a timestamp;
calculating a difference between the timestamp in the response signal and a time reference; and
identifying the one or more clock drifts based on the difference that is calculated, wherein the one or more of the times that are modified are changed by the difference that is calculated.

7. The method of claim 1, further comprising:
one or more of stopping movement of the vehicle system or engaging one or more brakes not at the location of interest responsive to determining the location of interest of the leak.

8. A brake monitoring system comprising:
plural sensor assemblies configured to measure pressures in a brake system of a vehicle system at different locations in the vehicle system, two or more of the sensor assemblies at the different locations configured to determine decreases in the pressures that are monitored and to determine times at which the decreases in the pressures occurred, at least one of the sensor assemblies configured to re-measure at least one of the pressures in at least one of the different locations following a designated delay after the at least one of the pressures was previously measured in the at least one of the different locations; and
a system controller configured to identify a leak in the brake system responsive to the at least one of the pressures that was re-measured not being below a designated threshold associated with a designated brake application, the system controller configured to determine a location of interest of the leak in the brake system responsive to identifying the leak by identifying an earliest of the times at which the decreases in the pressures occurred and the location associated with the earliest of the times.

9. The brake monitoring system of claim 8, wherein the sensor assemblies are configured to monitor air pressures of the brake system as the pressures.

10. The brake monitoring system of claim 8, wherein the brake system is an air brake system that extends through and fluidly couples multiple vehicles of the vehicle system.

11. The brake monitoring system of claim 8, wherein the sensor assemblies are configured to be disposed onboard each of two or more vehicles in the vehicle system.

12. The brake monitoring system of claim 8, wherein the system controller is configured to modify one or more of the times at which the decreases in the pressures occurred based on one or more clock drifts of one or more clock devices located at one or more of the locations where the pressures are measured.

13. The brake monitoring system of claim 12, wherein the system controller is configured to identify the one or more clock drifts by sending a poll message to the one or more clock devices, receiving a response signal from the one or more clock devices that includes a timestamp, and calculating a difference between the timestamp in the response signal and a time reference, the system controller configured to modify the one or more of the times at which the decreases in the pressures occurred by changing the one or more of the times by the difference that is calculated.

14. A brake monitoring system comprising:
plural sensor assemblies configured to be disposed onboard different non-propulsion-generating vehicles of a multi-vehicle system, the sensor assemblies including pressure sensors configured to repeatedly measure air pressures in an air brake system of the vehicle system at different times separated by a designated delay, the sensor assemblies including clock devices and assembly controllers configured to determine decreases in the pressures that are monitored and to determine times at which the decreases in the pressures occurred from the clock devices; and
a system controller configured to receive the air pressures and the times from the sensor assemblies, the system controller configured to determine a location of interest of a leak in the brake system responsive to determining that the air pressures at the location of interest did not decrease below a designated threshold associated with a designated brake application after the designated delay and that the decrease in the air pressures at the location of interest was measured before others of the decreases in the air pressures.

15. The brake monitoring system of claim 14, wherein the multi-vehicle system is a rail vehicle system.

16. The brake monitoring system of claim 14, wherein the system controller is configured to determine the location of interest as the location associated with the sensor assembly that provided an earliest time of the times to the system controller.

17. The brake monitoring system of claim 14, wherein the sensor assemblies are configured to confirm the decreases in the pressures by repeating measurement of the pressures following determining the times at which the decreases in the pressures are determined.

18. The brake monitoring system of claim 14, wherein the system controller is configured to modify one or more of the times from one or more of the sensor assemblies due to clock drift of one or more of the clock devices.

19. The brake monitoring system of claim 18, wherein the system controller is configured to identify the clock drift by sending a poll message to the one or more of the sensor assemblies, receiving a response signal from the one or more of the sensor assemblies that includes a timestamp, and calculating a difference between the timestamp in the response signal and a time reference, the system controller configured to modify the one or more of the times from the one or more of the sensor assemblies by changing the one or more of the times by the difference that is calculated.

20. The brake monitoring system of claim 14, wherein the system controller is configured to one or more of stop movement of the vehicle system or engage one or more brakes not at the location of interest responsive to determining the location of interest of the leak.

\* \* \* \* \*